(12) United States Patent
Ma et al.

(10) Patent No.: US 10,638,143 B2
(45) Date of Patent: Apr. 28, 2020

(54) ADVANCED SCREEN CONTENT CODING WITH IMPROVED COLOR TABLE AND INDEX MAP CODING METHODS

(71) Applicant: Futurewei Technologies, Inc., Plano, TX (US)

(72) Inventors: Zhan Ma, Fremont, CA (US); Meng Xu, Santa Clara, CA (US); Wei Wang, San Jose, CA (US); Xian Wang, Cupertino, CA (US); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 344 days.

(21) Appl. No.: 14/664,284

(22) Filed: Mar. 20, 2015

(65) Prior Publication Data

US 2015/0271505 A1    Sep. 24, 2015

Related U.S. Application Data

(60) Provisional application No. 61/968,785, filed on Mar. 21, 2014.

(51) Int. Cl.
*H04N 19/186* (2014.01)
*H04N 19/103* (2014.01)
(Continued)

(52) U.S. Cl.
CPC ........... *H04N 19/27* (2014.11); *H04N 19/176* (2014.11); *H04N 19/463* (2014.11); *H04N 19/593* (2014.11)

(58) Field of Classification Search
CPC .... H04N 19/27; H04N 19/103; H04N 19/176; H04N 19/186; H04N 19/463; H04N 19/593
(Continued)

(56) References Cited

U.S. PATENT DOCUMENTS

| 4,620,233 A | 10/1986 | Ogawa et al. |
| 5,463,702 A | 10/1995 | Trueblood |

(Continued)

FOREIGN PATENT DOCUMENTS

| CN | 102611888 A | 7/2012 |
| CN | 105745671 A | 7/2016 |

(Continued)

OTHER PUBLICATIONS

Guo, L., et al., "Palette Mode for Screen Content Coding," Joint Collaborative Team on Video Coding (JCT-VC) of ITU-T SG 16 WP 3 and ISO/IEC JCT1/SC 29/WG 11, JCTVC-M0323, Apr. 18-26, 2013, 6 pages.

(Continued)

*Primary Examiner* — Jamie J Atala
*Assistant Examiner* — Joon Kwon
(74) *Attorney, Agent, or Firm* — Conley Rose, P.C.

(57) ABSTRACT

An apparatus and method for screen content encoding includes deriving a palette table and a color index map based on a coding unit (CU). The method also includes encoding the palette table and encoding the color index map. The method further includes combining the encoded palette table and the encoded color index map for transmission to a receiver, where the palette table and index map are decoded to reconstruct a pixel block.

24 Claims, 8 Drawing Sheets

(51) Int. Cl.
*H04N 19/27* (2014.01)
*H04N 19/593* (2014.01)
*H04N 19/176* (2014.01)
*H04N 19/463* (2014.01)

(58) Field of Classification Search
USPC .................................................. 375/240.08
See application file for complete search history.

(56) References Cited

U.S. PATENT DOCUMENTS

| | | | |
|---|---|---|---|
| 5,848,195 A | 12/1998 | Romriell | |
| 5,930,390 A | 7/1999 | Coelho | |
| 6,522,783 B1 | 2/2003 | Zeng et al. | |
| 6,597,812 B1 | 7/2003 | Fallon et al. | |
| 7,162,077 B2 | 1/2007 | Li | |
| 7,343,037 B1 | 3/2008 | Kadatch | |
| 2002/0101536 A1 | 8/2002 | Cook et al. | |
| 2003/0048943 A1* | 3/2003 | Ishikawa | G06T 9/005 382/166 |
| 2003/0076993 A1* | 4/2003 | Li | G06T 9/005 382/166 |
| 2003/0169932 A1* | 9/2003 | Li | G06T 9/00 382/239 |
| 2003/0202697 A1 | 10/2003 | Simard et al. | |
| 2005/0276489 A1 | 12/2005 | Ishikawa | |
| 2006/0071939 A1* | 4/2006 | Khouzam | H04N 1/644 345/596 |
| 2006/0204086 A1* | 9/2006 | Gargi | H04N 1/644 382/166 |
| 2007/0083546 A1 | 4/2007 | Minamino et al. | |
| 2007/0116370 A1 | 5/2007 | Smirnov | |
| 2007/0171489 A1 | 7/2007 | Oyanagi et al. | |
| 2007/0188514 A1 | 8/2007 | Li | |
| 2007/0195369 A1 | 8/2007 | McDowell et al. | |
| 2007/0280295 A1 | 12/2007 | Uchimura | |
| 2008/0152221 A1 | 6/2008 | Kadatch | |
| 2008/0310740 A1 | 12/2008 | Strom et al. | |
| 2009/0010533 A1 | 1/2009 | Hung | |
| 2009/0214138 A1 | 8/2009 | Cheng | |
| 2010/0220937 A1 | 9/2010 | Furbeck | |
| 2010/0329548 A1* | 12/2010 | Yoshimura | H04N 1/00278 382/164 |
| 2011/0243471 A1 | 10/2011 | Alshina et al. | |
| 2012/0275697 A1 | 11/2012 | McDowell et al. | |
| 2013/0114893 A1 | 5/2013 | Alakuijala | |
| 2013/0129237 A1 | 5/2013 | Yie et al. | |
| 2013/0148721 A1 | 6/2013 | Chen et al. | |
| 2013/0272419 A1 | 10/2013 | Song et al. | |
| 2014/0078342 A1 | 3/2014 | Li et al. | |
| 2014/0147040 A1* | 5/2014 | Tanaka | G06T 9/004 382/166 |
| 2014/0301475 A1* | 10/2014 | Guo | H04N 19/50 375/240.24 |
| 2015/0016501 A1* | 1/2015 | Guo | G06T 9/00 375/240.02 |
| 2015/0146976 A1 | 5/2015 | Ma et al. | |
| 2015/0186100 A1 | 7/2015 | Tsai et al. | |
| 2015/0264363 A1* | 9/2015 | Pu | H04N 19/186 375/240.02 |
| 2015/0264365 A1* | 9/2015 | Tsai | H04N 19/94 375/240.03 |
| 2015/0271505 A1 | 9/2015 | Ma et al. | |
| 2015/0281688 A1 | 10/2015 | Yie et al. | |
| 2016/0277760 A1 | 9/2016 | Li et al. | |

FOREIGN PATENT DOCUMENTS

| | | |
|---|---|---|
| CN | 105900432 A | 8/2016 |
| CN | 106030651 A | 10/2016 |
| EP | 1104176 A2 | 5/2001 |
| KR | 20080106185 A | 12/2008 |
| RU | 2407222 C2 | 12/2010 |
| WO | 2009002603 A1 | 12/2008 |
| WO | 2011068360 A2 | 6/2011 |
| WO | 2013046096 A1 | 4/2013 |
| WO | 2015054812 A1 | 4/2015 |
| WO | 2015077720 A1 | 5/2015 |
| WO | 2015103496 A2 | 7/2015 |

OTHER PUBLICATIONS

Zhu, W., et al., "Template-based palette prediction," Joint Collaborative Team on Video Coding (JCT-VC) of ITU-T SG 16 WP 3 and ISO/IECT JTC 1/SC 29/WG 11, Apr. 18-26, 2013, 8 pages.

Chen, J., et al., "Description of screen content coding technology proposal by Qualcomm," Joint Collaborative Team on Video Coding (JCT-VC) of ITU-T SG16 WP3 and ISO/IEC JTC1/SC29/WG11, JCTVC-Q0031, Mar. 27-Apr. 4, 2014, 18 pages.

Ma, Z., et al., "Description of screen content coding technology proposal by Huawei Technologies, Inc.," Joint Collaborative Team on Video Coding (JCT-VC) of ITU-T SG16 WP3 and ISO/IEC JTC1/SC29/WG11, JCTVC-Q0034, Mar. 27-Apr. 4, 2014, 14 pages.

Ma, Z., et al., "Description of screen content coding technology proposal by Huawei," Joint Collaborative Team on Video Coding (JCT-VC) of ITU-T SG16 WP3 and ISO/IEC JTC1/SC29/WG11, JCTVC-Q0034-r1, Mar. 27-Apr. 4, 2014, 22 pages.

Foreign Communication From a Counterpart Application, European Application No. 15764799.1, European Application No. 15764799.1, Partial Supplementary European Search Report dated Sep. 12, 2016, 10 pages.

Chen, C., et al., "Description of screen content coding technology proposal by NCTU and ITRI International," JCTVC-Q0032, Mar. 27-Apr. 4, 2014, 26 pages.

Lai, et al., "Description of screen content coding technology proposal by MediaTek," JCTVC-Q0033, Mar. 27-Apr. 1, 2014, 32 pages.

Wang, W., et al., "AHG8: String match in coding of screen content," JCTVC-Q0176-r1, Mar. 27-Apr. 4, 2014, 12 pages.

Foreign Communication From a Counterpart Application, European Application No. 15764799.1, Extended European Search Report dated Jan. 23, 2017, 18 pages.

Chaumont, M., et al., "A 8-Bit-Grey-Level Image Embedding ITS 512 Color Palette," EUSIPCO'08: 16th European Signal Processing Conference, Retrieved from <http://hal-lirmm.ccsd.cnrs.fr/file/index/docid/348615/filename/EUSIPCO_2008_ColorHiding_Chaumont_Puech.pdf>, Dec. 19, 2008, 6 pages.

Sullivan, G.J., et al., "Standardized Extensions of High Efficiency," IEEE Journal of Selected Topics in Signal Processing, Mitsubishi Electric Research Laboratories, TR2013-105, Retrieved from <http://www.merl.com/publications/docs/TR2013-105.pdf>, Oct. 11, 2013, 19 pages.

Foreign Communication From a Counterpart Application, PCT Application No. PCT/US2015/021797, International Search Report dated Jul. 29, 2015, 3 pages.

Foreign Communication From a Counterpart Application, PCT Application No. PCT/US2015/021797, Written Opinion dated Jul. 29, 2015, 5 pages.

Machine Translation and Abstract of Chinese Publication No. CN102611888, Jul. 25, 2012, 8 pages.

Foreign Communication From a Counterpart Application, Chinese Application No. 201580009874.6, Chinese Search Report dated Apr. 20, 2018, 8 pages.

Foreign Communication From a Counterpart Application, Chinese Application No. 201580009874.6, Chinese Office Action dated Aug. 2, 2018, 5 pages.

Foreign Communication From a Counterpart Application, Chinese Application No. 201580009874.6, Chinese Search Report dated Jul. 25, 2018, 2 pages.

Machine Translation and Abstract of Korean Publication No. KR20080106185, Dec. 4, 2008, 17 pages.

Foreign Communication From a Counterpart Application, Korean Application No. 10-2016-7016238, Korean Office Action dated Jul. 10, 2018, 9 pages.

(56) References Cited

OTHER PUBLICATIONS

Foreign Communication From a Counterpart Application, Korean Application No. 10-2016-7016238, English Translation of Korean Office Action dated Jul. 10, 2018, 6 pages.
Machine Translation and Abstract of Chinese Publication No. CN105900432, Aug. 24, 2016, 13 pages.
Yanhuan, W., "Design of Dynamic Power Management for Embedded System," May 2010, 56 pages.
Foreign Communication From a Counterpart Application, Chinese Application No. 201580016913.5, Chinese Search Report dated Apr. 10, 2018, 3 pages.
Foreign Communication From a Counterpart Application, Chinese Application No. 201580016913.5, Written Opinion dated Apr. 18, 2018, 9 pages.
Sullivan, G., et al., "Meeting Report of 14th Meeting of the Joint Collaborative Team on Video Coding (JCT-VC)," XP030114945, JCTVC-N1000, Vienna, AT, Jul. 25-Aug. 2, 2013, 207 pages.
Guo, L., et al., "RCE3: Results of Test 3.1 on Palette Mode for Screen Content Coding," XP030114764, JCTVC-N0247, Jul. 25-Aug. 2, 2013, 7 pages.
Flynn, D., et al., "BoG report on Range Extensions topics" XP030115433, JCTVC-O0352-v5, Nov. 1, 2013, 49 pages.
Guo, X., et al., "AHG8: Major-color-based screen content coding," XP030115219, JCTVC-O0182-v3, Oct. 23-Nov. 1, 2013, 10 pages.
Foreign Communication From a Counterpart Application, European Application No. 14864463.6, European Result of Consultation dated Sep. 6, 2018, 7 pages.
Ma, Z., et al., "Advanced Screen Content Coding Using Color Table and Index Map," XP011558255, vol. 23, No. 10, Oct. 2014, pp. 4399-4412.
Ivanov, D., et al., "Color Distribution—a new approach to texture compression," XP009008909, Eurographics, vol. 19, No. 3, Aug. 21, 2000, 8 pages.
Guo, L., et al., "Color Palette for Screen Content Coding," XP055179887, ICIP, Oct. 2014, pp. 5556-5560.
Lan, C., et al., "Compress Compound Images in H.264/MPGE-4 AVC by Exploiting Spatial Correlation," IEEE Transactions on Image Processing, vol. 19, No. 4, Apr. 2010, pp. 946-957.
Lan, C., et al., "Intra and inter coding tools for screen contents," JCTVC-E145, Mar. 16-23, 2011, 12 pages.
Xiu, X., et al., "Description of Screen Content Coding Technology Proposal by InterDigital," XP030115927, JCTVC-Q0037, Mar. 27-Apr. 4, 2014, 30 pages.
Zhu, J., et al., "AHG10: Modified copy above mode for palette based coding," XP030116122, JCTVC-Q0174, Mar. 27-Apr. 4, 2014, 3 pages.
Huang, Y., et al., "Description of Screen Content Core Experiment 3 (SCCE3): Palette mode," XP030116244, JCTVC-Q1123, Mar. 27-Apr. 4, 2014, 11 pages.
Lin, T., "Mixed Chroma Sampling-rate coding: combining the merits of 4:4:4 and 4:2:0 and increasing the value of past 4:2:0 investment," XP030111092, JCTVC-H0065, Feb. 1-10, 2012, 5 pages.
Xu, J., et al., "Non-RCE3: base color merging for MBCIM," JCTVC-N0235, Jul. 25-Aug. 2, 2013, 8 pages.
Foreign Communication From a Counterpart Application, European Application No. 15795914.9, Extended European Search Report dated Jul. 8, 2016, 10 pages.
Foreign Communication From a Counterpart Application, PCT Application No. PCT/CN2015/079635, International Search Report dated Jul. 28, 2015, 7 pages.
Foreign Communication From a Counterpart Application, PCT Application No. PCT/CN2015/079635, Written Opinion dated Jul. 28, 2015, 4 pages.
Foreign Communication From a Counterpart Application, Russian Application No. 2016124544, Russian Search Report dated Aug. 31, 2017, 2 pages.
Foreign Communication From a Counterpart Application, Russian Application No. 2016124544, English Translation of Russian Search Report dated Aug. 31, 2017, 2 pages.

Foreign Communication From a Counterpart Application, Russian Application No. 2016124544, Russian Office Action dated Sep. 4, 2017, 5 pages.
Foreign Communication From a Counterpart Application, Russian Application No. 2016124544, English Translation of Russian Office Action dated Sep. 4, 2017, 3 pages.
Foreign Communication From a Counterpart Application, Japanese Application No. 2016-533032, Japanese Office Action dated Oct. 3, 2017, 3 pages.
Foreign Communication From a Counterpart Application, Japanese Application No. 2016-533032, English Translation of Japanese Office Action dated Oct. 3, 2017, 2 pages.
Foreign Communication From a Counterpart Application, New Zealand Application No. P41870NZ00, New Zealand Office Action dated Aug. 29, 2016, 7 pages.
Foreign Communication From a Counterpart Application, New Zealand Application No. P41870NZ00, New Zealand Office Action dated Jul. 25, 2017, 7 pages.
Foreign Communication From a Counterpart Application, European Application No. 14864463.6, Extended European Search Report dated Sep. 21, 2016, 12 pages.
Foreign Communication From a Counterpart Application, Japanese Application No. 2016-533032, Japanese Office Action dated Jun. 13, 2017, 5 pages.
Foreign Communication From a Counterpart Application, Japanese Application No. 2016-533032, English Translation of Japanese Office Action dated Jun. 13, 2017, 6 pages.
Foreign Communication From a Counterpart Application, PCT Application No. PCT/US14/67155, International Search Report dated Mar. 10, 2015, 10 pages.
Office Action dated Jun. 22, 2017, 7 pages, U.S. Appl. No. 14/719,064, filed May 21, 2015.
Office Action dated Sep. 28, 2017, 17 pages, U.S. Appl. No. 14/719,064, filed May 21, 2015.
Office Action dated Apr. 28, 2017, 3 pages, U.S. Appl. No. 14/549,405, filed Nov. 20, 2014.
Office Action dated Aug. 12, 2016, 17 pages, U.S. Appl. No. 14/549,405, filed Nov. 20, 2014.
Office Action dated Feb. 15, 2017, 26 pages, U.S. Appl. No. 14/549,405, filed Nov. 20, 2014.
Office Action dated Oct. 4, 2017, 21 pages, U.S. Appl. No. 14/549,405, filed Nov. 20, 2014.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
Foreign Communication From a Counterpart Application, Chinese Application No. 201580016913.5, Chinese Search Report dated Dec. 28, 2017, 7 pages.
Lin, T., et al., "AHG7: Full-chroma (YUV444) dictionary=hybrid dual-coder extension of HEVC", JCT-VC of ITU-T SG 16 WP 3 and ISO/IEC JTC 1/SC 29/WG 11, JCTVC-K0133, dated Oct. 10-19, 2012, 5 pages.
Zhu W., et al., "RCE3 Test 2: Multi-stage Base Color and Index Map", JCTVC of ITU-T SG 16 WP 3 and ISO/IEC JTC 1/SC 29/WG 11, JCTVC-N0287, Jul. 25-Aug. 2, 2013, 8 pages.
Guo, L., et al., "Non-RCE3: Modified Palette Mode for Screen Content Coding", JCTVC of ITU-T SG 16 WP 3 and ISO/IEC JTC 1/SC 29/WG 11, JCTVC-N0249, Jul. 25-Aug. 2, 2013, 6 pages.
Kwon, D.K., et al., "RCE3: Results of test 3.3 on Intra motion compensation," JCTVC of ITU-T SG 16 WP 3 and ISO/ IEC JTC 1/SC 29/WG 11, JCTVC-N0205, Jul. 25-Aug. 2, 2013, 8 pages.
Pang, C., et al., "Non-RCE3: Intra Motion Compensation with 2-D MVs", JCTVC of ITU-T SG 16 WP 3 and ISO/IEC JTC 1/SC 29/WG 11, JCTVC-N0256, Jul. 25-Aug. 2, 2013, 12 pages.
Pang, C., et al., "Non-RCE3: Pipeline Friendly Intra Motion Compensation", JCT-VC of ITU-T SG 16 WP 3 and ISO/ IEC JTC 1/SC 29/WG 11, JCTVC-N0254, Jul. 25-Aug. 2, 2013 , 4 pages.
Flynn, D., et al., "High Efficiency Video Coding (HEVC) Range Extensions text specification: Draft 2 (for PDAM)" JCT-VC OF ITU-T SG 16 WP 3 and ISO/IEC JTC 1/SC 29/WG 11, 12th Meeting, Geneva, CH, JCTVC-L1005, Jan. 14-23, 2013, 313 pages.

(56) References Cited

OTHER PUBLICATIONS

Yu, H., et al., "Draft call for proposals for coding of screen content and medical visual content", ISO/IEC JTC1/SC29/WG11 N13829, Jul. 2013, 8 pages.

* cited by examiner

601
Palette Predictor

| Idx | Y/G | Cb/B | Cr/R |
|---|---|---|---|
| 0 | 0 | 0 | 0 |
| 1 | 0 | 0 | 255 |
| 2 | 0 | 10 | 0 |
| 3 | 0 | 10 | 10 |
| 4 | 0 | 10 | 15 |
| 5 | 50 | 0 | 0 |
| 6 | 50 | 0 | 255 |
| 7 | 60 | 20 | 20 |
| 8 | 60 | 20 | 30 |
| 9 | 120 | 0 | 0 |
| 10 | 120 | 0 | 10 |
| 11 | 192 | 192 | 192 |
| 12 | 255 | 0 | 0 |
| 13 | 255 | 0 | 255 |
| 14 | 255 | 255 | 240 |
| 15 | 255 | 255 | 255 |

603
Current palette table

| Idx | Y/G | Cb/B | Cr/R |
|---|---|---|---|
| 0 | 0 | 0 | 192 |
| 1 | 0 | 0 | 240 |
| 2 | 0 | 0 | 255 |
| 3 | 0 | 10 | 0 |
| 4 | 0 | 10 | 10 |
| 5 | 0 | 10 | 12 |
| 6 | 60 | 20 | 0 |
| 7 | 60 | 20 | 30 |
| 8 | 60 | 50 | 0 |
| 9 | 80 | 0 | 0 |
| 10 | 120 | 0 | 0 |
| 11 | 150 | 0 | 0 |
| 12 | 255 | 255 | 255 |

FIG. 6

ADVANCED SCREEN CONTENT CODING WITH IMPROVED COLOR TABLE AND INDEX MAP CODING METHODS

CROSS-REFERENCE TO RELATED APPLICATION(S) AND CLAIM OF PRIORITY

This application claims priority under 35 U.S.C. § 119(e) to U.S. Provisional Patent Application No. 61/968,785, filed Mar. 21, 2014, entitled "ADVANCED SCREEN CONTENT CODING SOLUTION WITH IMPROVED COLOR TABLE AND INDEX MAP CODING METHODS-PART 2", which is hereby incorporated by reference into this application as if fully set forth herein.

TECHNICAL FIELD

The present disclosure relates generally to screen content coding, and more particularly, to advanced screen content coding with improved color (palette) table and index map coding.

BACKGROUND

Screen content coding creates new challenges for video compression because of its distinct signal characteristics compared to conventional video signals. There are multiple existing techniques for advanced screen content coding, e.g., pseudo string match, color palette coding, and intra motion compensation or intra block copy. Among these techniques, pseudo string match shows the highest gain for lossless coding, but with significant complexity overhead and difficulties on lossy coding mode. Color palette coding is developed for screen content under the assumption that non-camera captured content (e.g., computer-generated content) typically contains a limited number of distinct colors, rather than the continuous or near-continuous color tones found in many video sequences. Even though the pseudo string match and color palette coding methods showed great potential, intra motion compensation or intra block copy was adopted into the working draft (WD) version 4 and reference software of the on-going High Efficiency Video Coding (HEVC) range extension for screen content coding. However, the coding performance of intra block copy is bounded because of its fixed block decomposition. Performing block matching (similar to motion estimation in intra picture) also increases the encoder complexity significantly on both computing and memory access.

SUMMARY

According to one embodiment, there is provided a method for screen content encoding. The method includes deriving a palette table and a color index map based on a coding unit (CU). The method also includes encoding the palette table and encoding the color index map. The method further includes combining the encoded palette table and the encoded color index map for transmission to a receiver. At the receiver, the palette table and index map are decoded to reconstruct a pixel block.

According to another embodiment, there is provided an apparatus configured for screen content encoding. The apparatus includes at least one memory and at least one processor coupled to the at least one memory. The at least one processor is configured to derive a palette table and a color index map based on a coding unit (CU), encode the palette table, encode the color index map, and combine the encoded palette table and the encoded color index map for transmission to a receiver.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a reference palette table and a current palette table for use in the screen content coding process;

DETAILED DESCRIPTION

Figure 1:
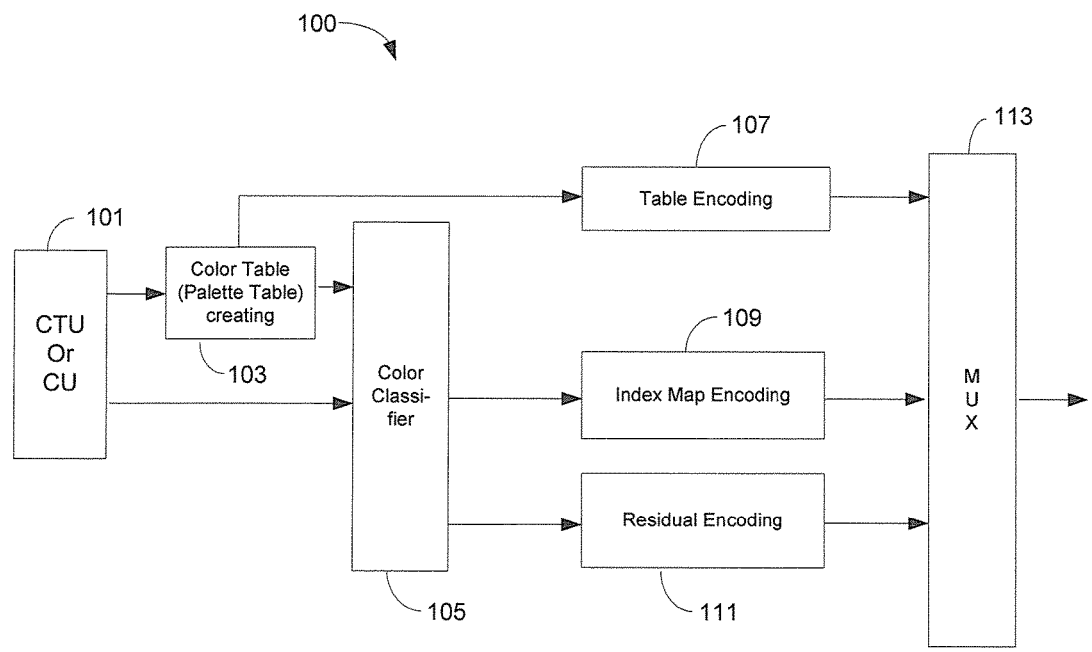
FIG. 1 illustrates a functional block diagram of an example transmitter that performs a screen content coding process according to this disclosure.

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The following documents and standards descriptions are hereby incorporated into the present disclosure as if fully set forth herein:

T. Lin, S. Wang, P. Zhang, K. Zhou, "AHG7: Full-chroma (YUV444) dictionary+hybrid dual-coder extension of HEVC", JCT-VC Document, JCTVC-K0133, Shanghai, China, October 2012 (hereinafter "REF1");

W. Zhu, J. Xu, W. Ding, "RCE3 Test 2: Multi-stage Base Color and Index Map", JCT-VC Document, JCTVC-N0287, Vienna, Austria, July 2013 (hereinafter "REF2");

L. Guo, M. Karczewicz, J. Sole, "RCE3: Results of Test 3.1 on Palette Mode for Screen Content Coding", JCT-VC Document, JCTVC-N0247, Vienna, Austria, July 2013 (hereinafter "REF3");

L. Guo, M. Karczewicz, J. Sole, R. Joshi, "Non-RCE3: Modified Palette Mode for Screen Content Coding", JCT-VC Document, JCTVC-N0249, Vienna, Austria, July 2013 (hereinafter "REF4");

D.-K. Kwon, M. Budagavi, "RCE3: Results of test 3.3 on Intra motion compensation, JCT-VC Document, JCTVC-N0205, Vienna, Austria, July 2013 (hereinafter "REF5");

C. Pang, J. Sole, L. Guo, M. Karczewicz, R. Joshi, "Non-RCE3: Intra Motion Compensation with 2-D MVs", JCT-VC Document, JCTVC-N0256, Vienna, Austria, July 2013 (hereinafter "REF6");

C. Pang, J. Sole, L. Guo, M. Karczewicz, R. Joshi, "Non-RCE3: Pipeline Friendly Intra Motion Compensation", JCT-VC Document, JCTVC-N0254, Vienna, Austria, July 2013 (hereinafter "REF7");

D. Flynn, J. Soel and T. Suzuki, "Range Extension Draft 4", JCTVC-L1005, August 2013 (hereinafter "REF8"); and H. Yu, K. McCann, R. Cohen, and P. Amon, "Draft call for proposals for coding of screen content and medical visual content", ISO/IEC JTC1/SC29/WG11 N13829, July 2013 (hereinafter "REF9").

Embodiments of this disclosure provide an advanced screen content coding process with improved color table and index map coding. The disclosed embodiments significantly outperform the current version of High-Efficiency Video Coding (HEVC Version 2). The disclosed embodiments include multiple algorithms that are specifically for coding screen content. These algorithms include pixel representation using a palette table (or equivalently, color table), palette table (or equivalently, color table) compression, color index map compression, string search, and residual compression. The embodiments disclosed herein are developed, harmonized, and integrated with the HEVC Range Extension (RExt) as future HEVC extensions to support efficient screen content coding. However, these embodiments could additionally or alternatively be implemented with existing video standards or any other suitable video standards. For ease of explanation, HEVC RExt is used herein as an example to describe the various embodiments. Similarly, HEVC RExt software is used to implement the various embodiments to showcase the compression efficiency.

Figure 2:
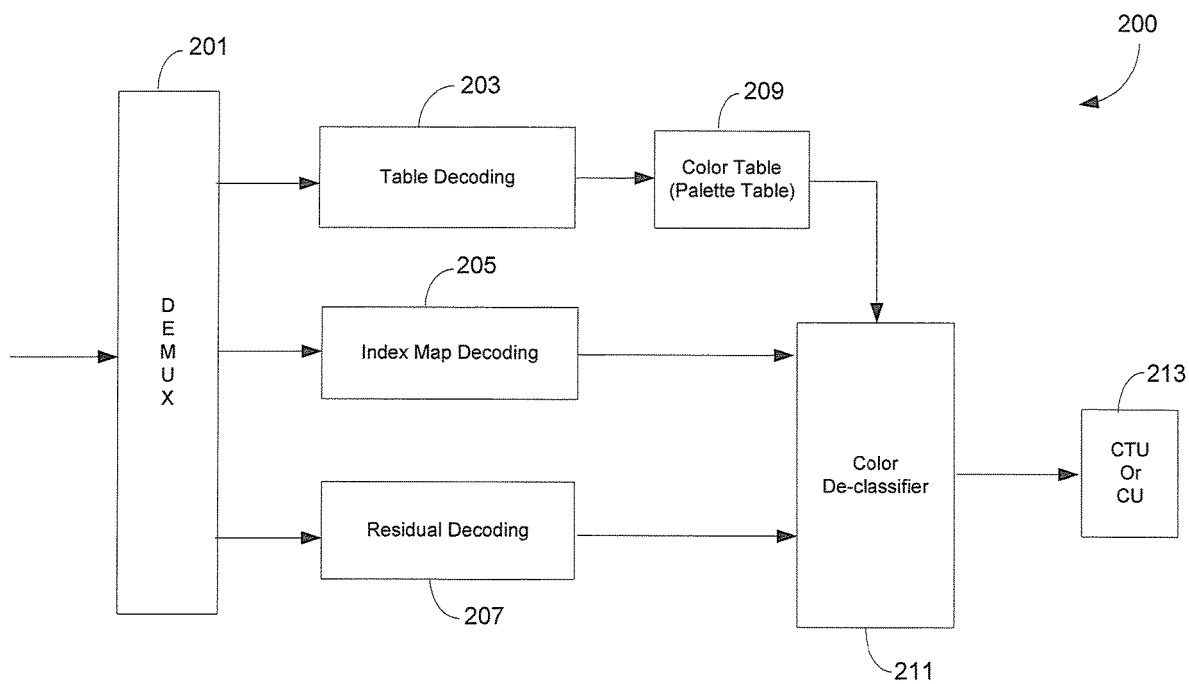
FIG. 2 illustrates a functional block diagram of an example receiver that performs a screen content decoding process according to this disclosure.

FIG. 1 illustrates a functional block diagram of an example transmitter that performs a screen content coding process according to this disclosure. FIG. 2 illustrates a functional block diagram of an example receiver that performs a screen content decoding process according to this disclosure. The embodiments of the transmitter 100 and the receiver 200 are for illustration only. Other embodiments of the transmitter 100 and the receiver 200 could be used without departing from the scope of this disclosure.

Figure 3:
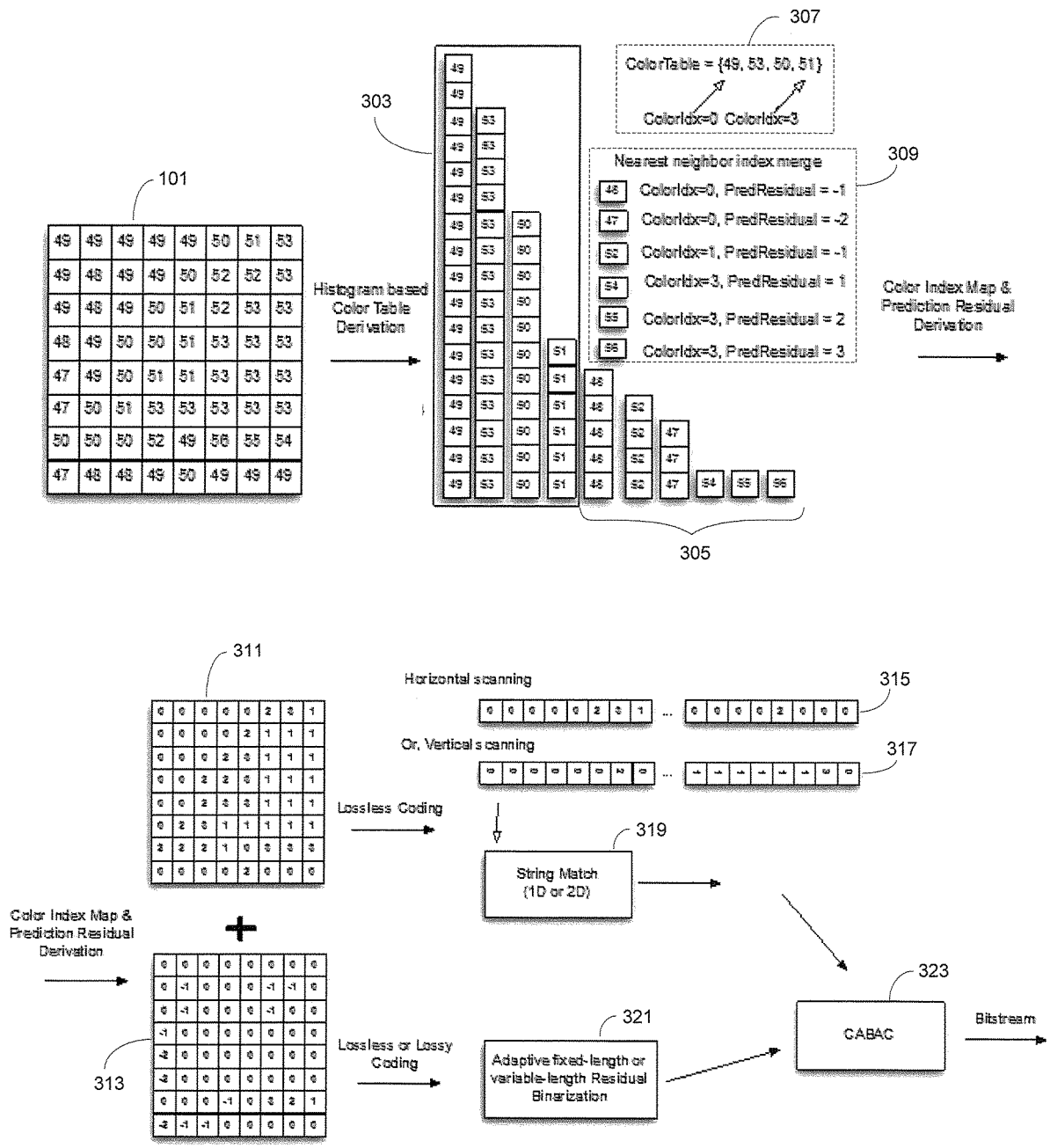
FIG. 3 illustrates an example of various modules and processing flow using a palette table and index map.

The transmitter 100 is configured to perform a high-efficiency color palette compression (CPC) process that can be performed on each coding unit (CU) or coding tree unit (CTU) in a bitstream. As shown in FIG. 1, the transmitter 100 starts with a CU 101 in a bitstream. A CU is a basic operating unit in HEVC and HEVC RExt, and is a squared block of pixels that includes three components (e.g., RGB, YUV, XYZ, or the like, as known in the art). An example CU 101 is shown in FIG. 3. The CU 101 is an 8 pixel×8 pixel CU that includes an explicit color value (e.g., 47, 48, 49, etc.) for each pixel. In other embodiments, the size of the CU 101 may be other than 8×8 pixels (e.g., 16×16 pixels, 32×32 pixels, etc.). In some embodiments, the transmitter 100 may start with a CTU 101 instead of a CU 101. For ease of explanation, the transmitter 100 will be described with a CU 101. Those of skill in the art will understand that the transmitter 100 can perform substantially the same process with a CTU 101.

Figure 4:
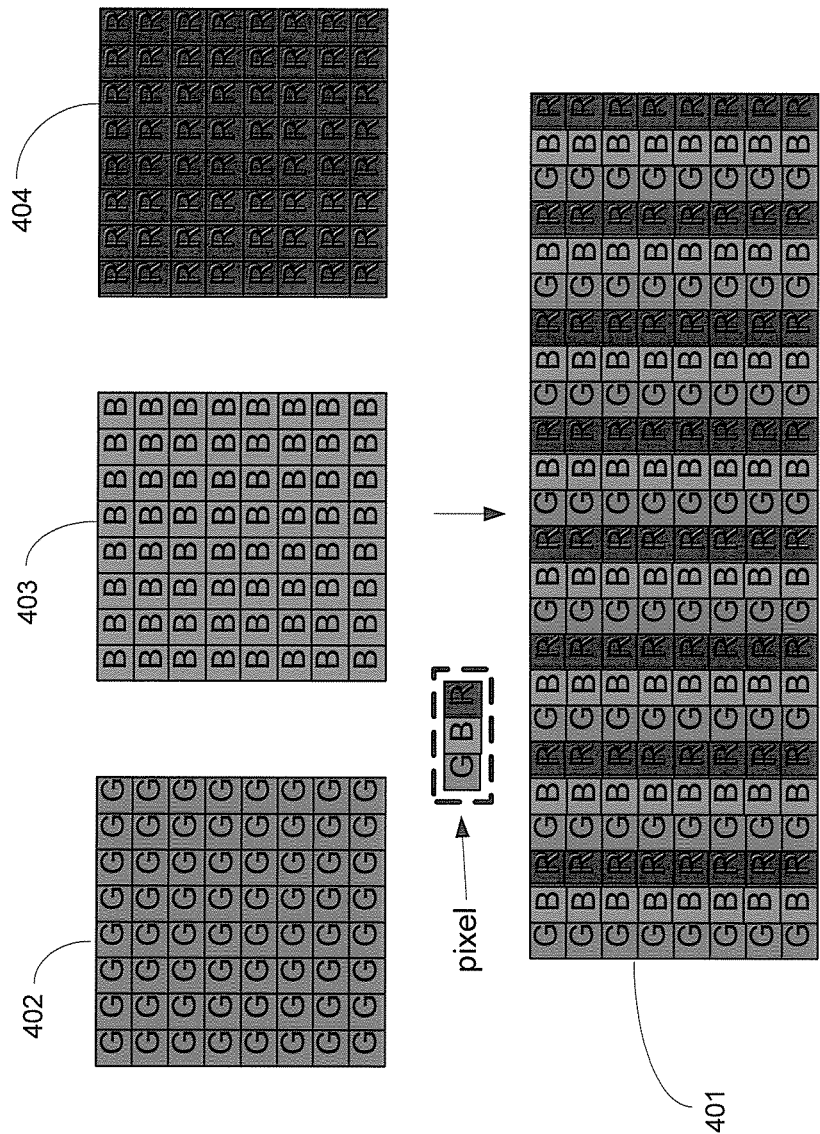
FIG. 4 illustrates an example coding unit (CU) with color components shown separately and interleaved.

FIG. 4 illustrates another example of a CU 401 with the color components shown separately in the figure. The CU 401 may represent the CU 101. The CU 401 is an 8 pixel×8 pixel CU where each pixel includes three color components, which in this case, are R, G, and B. That is, the CU 401 includes separate red (R) color components 404, green (G) color components 402, and blue (B) color components 403 that are interleaved together in a packing process. A basic packing processing unit includes packed G, B, R at the same pixel location. In other embodiments, the three color components could be Y, Cb, and Cr, or another suitable combination of components. Each color component may be represented by a number of color bits. For example, each of the GBR color components may be represented by eight bits; thus, each pixel color is a 24-bit color.

Figures 5A, 5B, 5C:
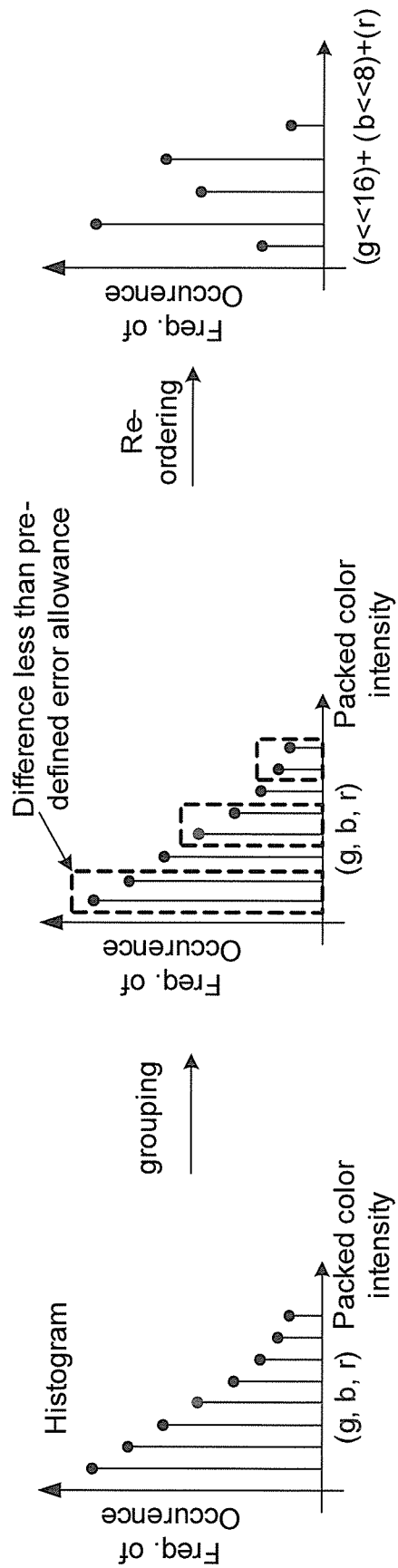
FIG. 5A through 5C illustrate a color histogram, a color grouping process, and a color reordering process for use in the screen content coding process.

A palette table creating block 103 uses the CU 101 to derive or generate a palette table (sometimes referred to as a color table). An example palette table 303 is shown in FIG. 3. To derive the palette table 303, the palette table creating block 103 orders the color values according to one or more ordering rules. The palette table 303 can be ordered according to an occurrence frequency of each color value, the actual color intensity of each pixel of the CU 101, or any other suitable ordering metric(s), to increase the efficiency of the following encoding operations. For example, as shown in FIG. 5A, the palette table creating block 103 examines the color value of each pixel in the CU 101 and creates a color histogram using the three color components together, i.e., packed G, B, R or packed Y, Cb, Cr according to the frequency of occurrence of each color in descending order. To represent each 24-bit color, the G and B color components can be bit-shifted accordingly. That is, each packed color can be represented according to a value (G<<16)+(B<<8)+(R), where <<x is a left bit shift operation.

For lossy coding, the palette table creating block 103 then applies a neighboring color grouping process on the histogram ordered color data to obtain a more compact palette table representation. The neighboring color grouping process can be performed according to a pre-defined color error allowance, as illustrated in FIG. 5B. The color grouping process can be performed in a multi-stage manner Within each stage, the color error allowance is equal to the current stage number, with the stage number increasing from 1 to a predetermined maximum error tolerance. In some embodiments, the maximum error tolerance is equal to 9. A more generalized QP dependent color error allowance could be used as well.

After neighboring color grouping, the palette table creating block 103 picks N packed colors with the highest frequency of occurrence. N is bounded by a predetermined maximum number of colors (max_num_of colors). In some embodiments, max_num_of colors=128, i.e., N<=128. The N chosen colors are then reordered by sorting the colors in ascending order based on the value of each packed color, as shown in FIG. 5C. The result is a palette table such as the palette table 303 shown in FIG. 3. The palette table 303 has a size of four colors (i.e., N=4). In many embodiments, N>4. However, for ease of explanation, N is selected as 4 in FIG. 3.

When the number of colors represented in the CU 101 is greater than the number of colors N in the palette table 303, the less-frequently occurring colors are arranged as residuals outside of the palette table 303. For example, the color values 49, 53, 50, and 51 are part of the palette table 303, while the color values 48, 52, 47, 54, 55, and 56 are residual colors 305 outside of the palette table 303.

As discussed above, the neighboring color grouping process is performed on the histogram ordered color data to obtain a more compact palette table representation, in particular for lossy coding. Given a histogram H with n colors, where each color contains three components, the neighboring color grouping process can be described by the following pseudo code. For the lossy coding mode, the max iteration number T equals the color error allowance.

---

(Pseudo code):

Order H[0] to H[n−1] in descending order according to the frequency of occurrence;
for ( iter = 0; iter < T; iter++ )
{
    for ( idxCur = 1; idxCur < n; idxCur++ )
    {
        for ( idxMergeCandidate = 0; idxMergeCandidate < idxCur; idxMergeCandidate++ )
        {
            if ( d( H[idxCur], H[idxMergeCandidate] ) < iter )
            {
                group H[idxCur] to H[idxMergeCandidate];
                Reorder H[0] to H[idxMergeCandidate] in descending order;
                break;
            }
        }
    }
}

---

It is noted that this process for deriving the palette table 303 can be applied not only to the current CU, but also to neighboring CU reconstructed pixels for the palette table sharing process.

Turning again to FIG. 1, based on the derived palette table 303, a color classifier block 105 uses the CU 101 to assign the colors or pixel values of the CU 101 into a color index map 311 and one or more prediction residual maps 313. That is, the color classifier block 105 assigns each color in the palette table 303 to a color index within the palette table 303. For example, as indicated at 307 in FIG. 3, color 49 is assigned color index 0 (ColorIdx=0), color 53 is assigned color index 1, color 50 is assigned color index 2, and color 51 is assigned color index 3 (ColorIdx=3). Once the colors in the palette table 303 are assigned an index, the color index map 311 can be generated from the CU 101 using the indexes of each color. Likewise, each residual color 305 outside of the palette table 303 is assigned a prediction residual value, as indicated at 309. Once the residual colors 305 are assigned a prediction residual value, the prediction residual map 313 can be generated from the CU 101.

Palette Table (or Color Table) Coding

For each CU 101, the transmitter 100 can derive the palette table 303 from the current CU 101 (referred to as explicit palette table carriage) or the transmitter 100 can derive the palette table 303 from a left or upper neighbor of the current CU 101 (referred to as implicit palette table carriage). When the palette table 303 is derived from a neighboring CU, the palette table itself doesn't need to be included in the bitstream. Instead, two bins (one for a sharing flag, the other for a sharing direction) are carried in the bitstream to inform the decoder of the palette table carriage method. This implicit palette table carriage method is referred to as palette table sharing in this disclosure.

A table encoding block 107 receives the palette table 303 and encodes the entries in the palette table 303. For the explicit palette table carriage method, the table encoding block 107 applies either an inter-table palette stuffing technique or a differential color coding technique (also referred to as intra-table color DPCM (differential pulse code modulation)) to encode each entry in the palette table 303 sequentially for all three color components. The inter-table palette (color) stuffing technique is performed between the current table 303 and a reference table (also referred to as a palette predictor), while the intra-table color coding technique is performed within the current table 303. Given that stuffing is performed entry-by-entry, in some embodiments, there is another flag associated with each palette entry to indicate whether the color is re-used from the previous palette predictor.

Inter-Table Palette Stuffing

Even when the palette table sharing method is not used, there may still exist colors that are common between the palette table 303 and the palette predictor. Therefore, applying the inter-table palette stuffing technique entry-by-entry can further improve coding efficiency. Here, the palette predictor is derived from a neighboring block, such as a left neighbor CU or an upper neighbor CU. FIG. 6 illustrates a palette predictor 601 and a current palette table 603 that can be used with the inter-table palette stuffing technique according to this disclosure. The current palette table 603 may represent the palette table 303 of FIG. 3. The palette predictor 601 can be constructed from the left neighbor CU of the current CU. At the decoder side, the palette is updated appropriately according to the palette predictor 601 from reference neighbors. In some embodiments, the palette predictor could be inferred from a reconstructed neighboring CU or coding tree unit (CTU) or from a global table at the slice or sequence level. As known in the art, a slice includes multiple CUs in a picture. A picture may include one or multiple slices. A sequence includes multiple slices.

Let $c(i)$ and $r(j)$ represent the i-th entry in the current palette table 603 and the j-th entry in the palette predictor 601, respectively. It is noted again that each entry contains three color components (GBR, YCbCr, or the like). For each color entry $c(i)$, $i<=N$, in the current table 603, the table encoding block 107 finds an identical match $r(j)$ from the palette predictor 601. Instead of signaling $c(i)$, j is encoded predicatively. The predictor is determined as the smallest index k that is greater than the previously reconstructed/and that satisfies $r(k)[0]>=c(i-1)[0]$. The prediction difference (j−k) is signalled in the bitstream. Since the difference (j−k) is non-negative, no sign bit is needed.

It is noted that either a context adaptive model or a bypass model can be used to encode (j−k), as known in the art. Typically, a context adaptive model is used for high efficiency purposes while a bypass model is used for high-through and low-complexity requirement. In some embodiments of this disclosure, two context adaptive models can be used to encode the index prediction difference (j−k), using a dynamic truncated unary binarization scheme.

Intra-Table Color DPCM

If no match is found in the palette predictor 601 for the i-th entry in the current palette table 603, the value of the i-th entry is subtracted from the previous entry (the (i−1)th entry) and the absolute difference ($|d(i)|$) is encoded using color DPCM for each component. In general, fewer bits for the absolute predictive difference and a sign bit will be produced and encoded using intra-table color DPCM. Either a context adaptive model or a bypass model can be used to encode the absolute predictive difference and the associated sign bin, as known in the art. In addition, the sign bit could be hidden or not coded for the some cases. For example, given that the current palette table 603 is already ordered in ascending order, the Y (or G) component difference doesn't require a sign bit at all. Likewise, the Cb (or B) component difference doesn't need the sign bit if the corresponding Y (or G) difference is zero. Furthermore, the Cr (or R) component difference doesn't need the sign bit if both the Y (or G) and Cb (or B) differences are zeros. As another example, the sign bit can be hidden if the absolute difference is zero. As yet another example, the sign bit can be hidden if the following boundary condition is satisfied: c[i−1]−|d(i)|<0 or c[i−1]+|d(i)|>255.

For the first entry c(0) of the current table 603, if the inter-table palette stuffing technique is not used, each component of c(0) can be encoded using a fixed 8-bit bypass context model. Additionally or alternatively, it could be encoded using an adaptive context model to further improve the performance.

To better illustrate the inter-table palette stuffing and intra-table color DPCM techniques, an example using the data in the current palette table 603 will now be described.

Starting from the first entry c(0) of the current palette table 603, i.e., (G, B, R)=(0, 0, 192), it can be seen that c(0) does not have a match in the palette predictor 601, therefore c(0) is encoded independently. The second entry c(1) of the current palette table 603 ((G, B, R)=(0, 0, 240) also does not have a match in the palette predictor 601. Given that the first entry c(0) has already been coded, only the prediction difference between c(1) and c(0) should be carried in the bitstream, i.e., (0, 0, 240)−(0, 0, 192)=(0, 0, 48). For the third entry c(2) of the current table 603, an exact match is identified in the palette predictor 601 where j=1. The predictive index using the previously coded color entry is 0, therefore, only (1−0)=1 needs to be encoded. These coding techniques are applied until the last entry of the current table 603 (i.e., idx=12 in FIG. 6) is encoded. Table 1 provides a step by step illustration on how to apply inter-table sharing and intra-table DPCM on the current table 603 using the available palette predictor 601.

TABLE 1

Coding method for exemplary table in FIG. 6

| i (current table index) | Coding method | j (matched index in reference table (palette predictor)) | k (predicted matched index) | Coding element |
|---|---|---|---|---|
| 0 | Intra-table | | | (0, 0, 192) |
| 1 | Intra-table | | | (0, 0, 48) |
| 2 | Inter-table | 1 | 0 | 1 |
| 3 | Inter-table | 2 | 2 | 0 |
| 4 | Inter-table | 3 | 3 | 0 |
| 5 | Intra-table | | | (0, 0, 2) |
| 6 | Intra-table | | | (60, 10, −12) |
| 7 | Inter-table | 8 | 7 | 1 |
| 8 | Intra-table | | | (0, 30, −30) |
| 9 | Intra-table | | | (20, −50, 0) |
| 10 | Inter-table | 9 | 9 | 0 |
| 11 | Intra-table | | | (30, 0, 0) |
| 12 | Inter-table | 15 | 11 | 4 |

The coding of the palette table 603 can be summarized in the following pseudo code.

(Pseudo code):

```
for ( i = 0; i < N; i++ )
{
    if exist j such that r(j) = = c(i) // inter-table palette stuffing
    {
        if ( j = = 0 )
            k = 0;
        else
            k = minimum x satisfying x > prev_j and r(k)[0] >=
                c(i − 1)[0];
        prev_j = k;
        signal j − k;
```

(Pseudo code):

```
    }
    else // intra-table color DPCM
    {
        if ( i = = 0 )
            signal c(i);
        else
            signal c(i) − c(i − 1);
    }
}
```

Index Map Coding

Figure 7:
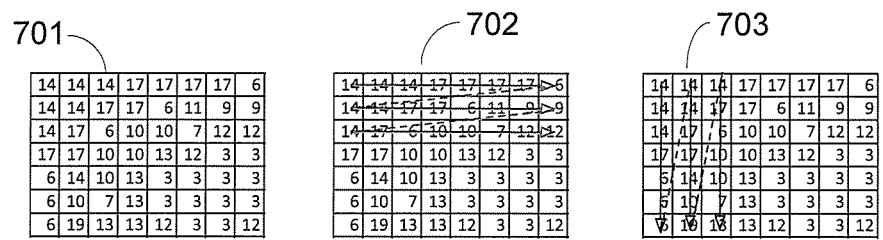
FIG. 7 illustrates examples of horizontal and vertical scanning in a color index map for use in the screen content coding process.

An index map encoding block 109 encodes the color index map 311 created by the color classifier block 105. To encode the color index map 311, the index map encoding block 109 performs at least one scanning operation (horizontal 315 or vertical 317) to convert the two-dimensional (2D) color index map 311 to a one-dimensional (1D) string. Then the index map encoding block 109 performs a string match algorithm (described below) to generate a plurality of matches. In some embodiments, the index map encoding block 109 performs separate horizontal and vertical scanning operations and performs the string match algorithm to determine which provides better results. FIG. 7 illustrates an example of horizontal and vertical scanning operations. In FIG. 7, an example 2D color index map 701 is shown. The color index map 701 can represent the color index map 311 of FIG. 3. The color index map 701 is an 8×8 map, but other sizes of color index map are possible. As shown in FIG. 7, horizontal scanning 702 or vertical scanning 703 can be performed on the color index map 701.

For each scanning operation (horizontal and vertical), a 2D block match algorithm can also be performed to generate a plurality of matched blocks, as described below. Using a combination of the 1D string match algorithm and the 2D block match algorithm, the index map encoding block 109 performs a hybrid 1D and 2D color index map coding process.

In the hybrid coding process, previously processed indices can be used as the reference for the successive index search. Multiple CTUs (e.g., 3 CTUs) to the left of the current CTU can be used as the reference area for the 2D block match algorithm.

Both the 1D and 2D match algorithms are performed for the current color index map 311 to determine a string match or block match 319. For a 1D match result, the index map encoding block 109 records the matched length and the corresponding distance or location. For a 2D match result, the index map encoding block 109 records the matched block width and height, the corresponding reference CTU index, and the location of the reference index in the CTU.

If the index map encoding block 109 cannot find a match for a current index value in the previously processed index values, the current index value is encoded as an unmatched index value by using a matched/unmatched flag (set to indicate an unmatched pixel) and the index value itself. In some embodiments, the matched/unmatched flag is a one-bit flag.

Figure 8:
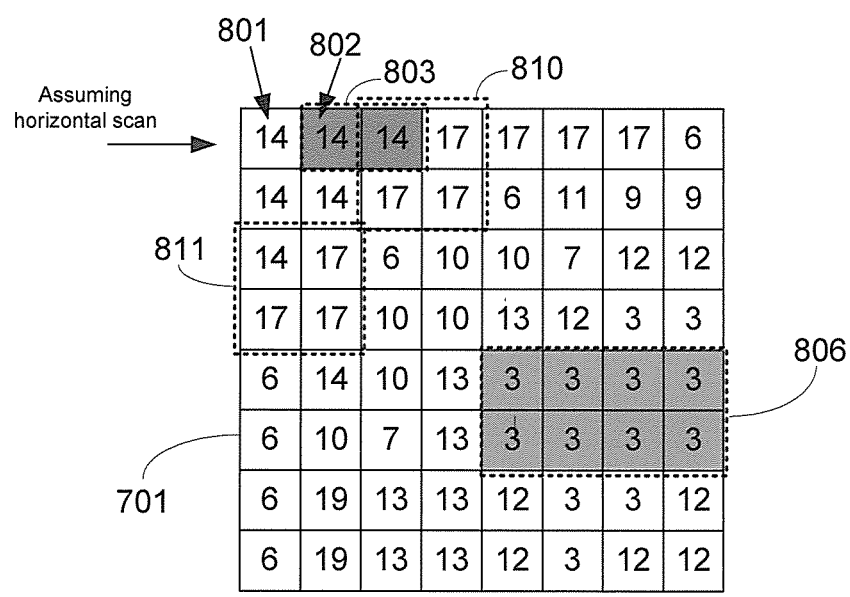
FIG. 8 illustrates an example operation of a hybrid 1D and 2D color index map coding process using a color index map.

For example, FIG. 8 illustrates an example operation of the hybrid 1D and 2D color index map coding process using the color index map 701 of FIG. 7. The first index map value 801 in the color index map 701 is 14. Assuming that no match for the first index map value 801 is found in a reference index map (e.g., there is no 14 in an adjacent color index map), then the first index map value 801 is coded as a non-match. Assuming a horizontal scanning process, the second index map value 802 is also 14. This is a match to the first index map value 801, which now can be a reference to the second index map value 802. Continuing the horizontal scan, it can be seen that another 14 is found to the right of the second index map value 802. No more consecutive 14's exist after the first index map value 801. Thus, the string 803 of index map values represents a 1D matched string for the first index map value 801.

For each index map value, a 2D block search is also performed. For example, for the two-dimensional 2×2 index map block 811 (which includes the values 14, 17, 17, 17), because the two-dimensional 2×2 index map block 810 also includes the values 14, 17, 17, 17, a 2D block match for index map block 811 is found at block 810. Alternatively, the width and height of a 2D block match can be fixed to the width and height of current CU.

The 1D and 2D search processes continue for each index map value in the color index map 701. Each index map value is either a non-match or part of a string match or block match. For example, a 2D block 806 with a width of 4 and a height of 2 is shown in FIG. 8. The 2D block 811 is a match for the index map block 810.

If the index map encoding block 109 selects a 1D matched string as its search result for a current index value, the encoding is performed by setting the matched/unmatched flag to indicate a matched pixel, setting a match type flag to 1D, and providing the distance (e.g., the offset between the position of the current index value and the position of the matched string) and the length of successive matched indices. If there are multiple 1D matches for the current index value, the index map encoding block 109 selects the match that provides the best rate-distortion (R-D) performance. To reduce complexity, some embodiments use a heuristic algorithm to select the match with the longest matched length.

If the index map encoding block 109 selects a 2D matched block as its search result for a current index value, the encoding is performed by setting the matched/unmatched flag to indicate a matched pixel, setting the match type flag to 2D, and providing the reference CTU index, the distance (the address of the matched position in the reference CTU) and the width and height of the matched block. If there are multiple 2D matches for the current index value, the index map encoding block 109 selects the matched block that provides the best R-D performance. To reduce complexity, some embodiments use a heuristic algorithm to select the block with the biggest matched area.

Figure 9:
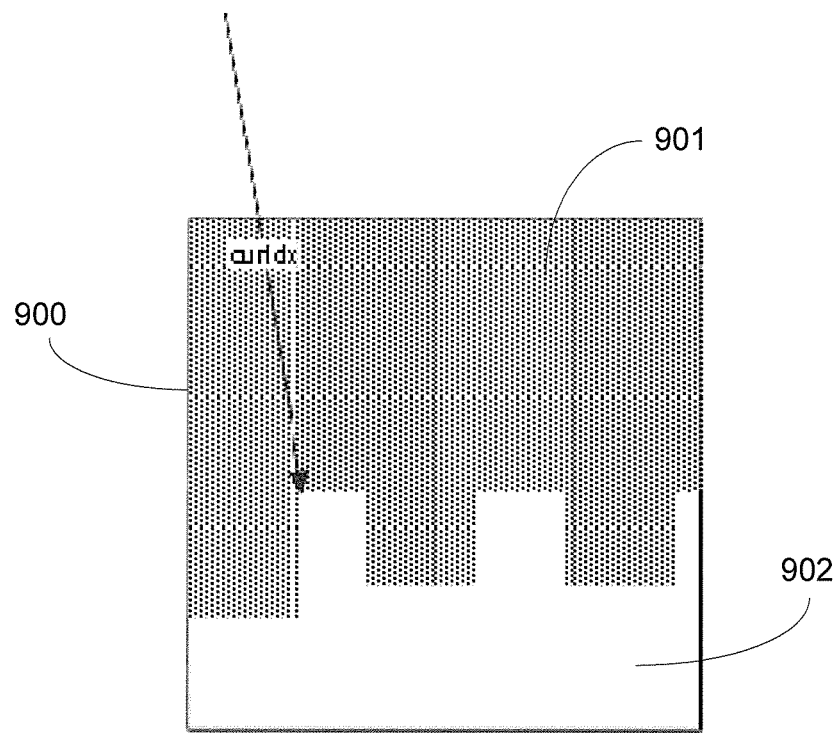
FIG. 9 illustrates an example coded map.
Figure 10:
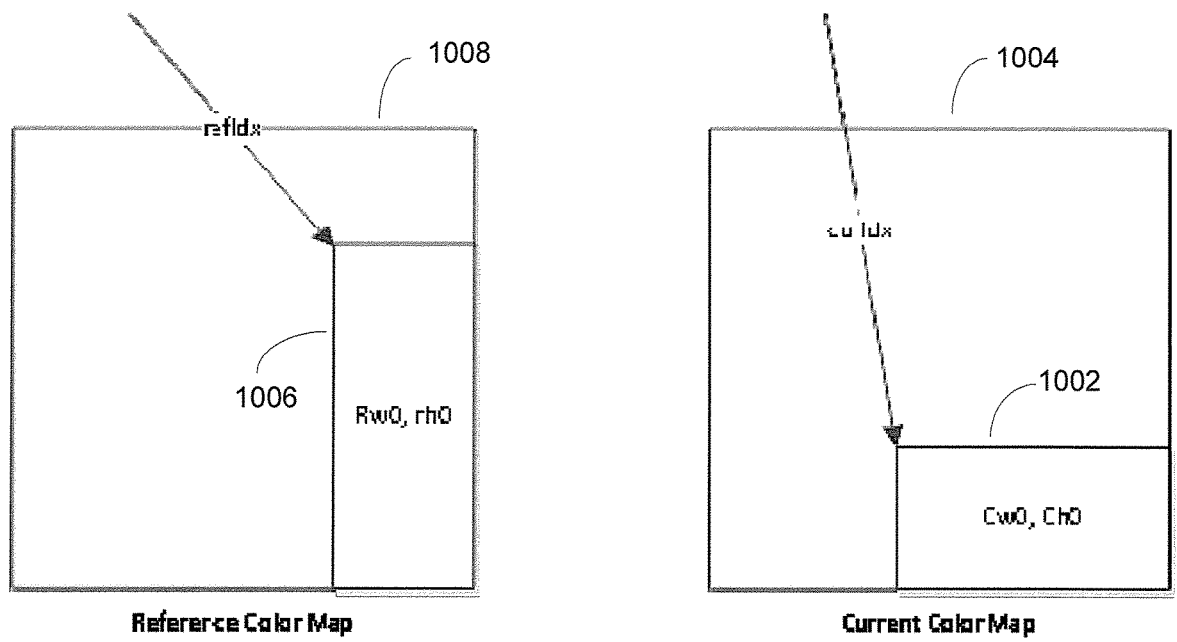
FIGS. 10 and 11 illustrate examples of a reference color index map and a current color index map for use in the screen content coding process.

In some embodiments, a coded map is introduced in the hybrid 1D and 2D color index map coding process. For example, FIG. 9 illustrates an example coded map 900. The coded map 900 corresponds to a color index map, such as the color index map 701. Whenever a match is found during the hybrid 1D and 2D color index map coding process, the area represented by a 1D string match or a 2D block match is marked as coded in the coded map 900. For example, in the coded map 900, the region 901 is a coded region comprised of 1D string matches and 2D block matches. The region 902 is an un-coded region that has not yet been coded. After the coding of the current index is finished, the index map encoding block 109 scans through the coded map 900 to find the first un-coded location as the next index to process. In some embodiments, this location may be identified as curIdx, as shown in FIG. 9. In the hybrid 1D/2D search, if any of the locations in the current string have already been coded in previous 2D searches, the match result for this location is treated as a match even though the index value between the current location and reference location may be different.

Turning again to FIG. 1, a residual encoding block 111 encodes the prediction residual map 313 created by the color classifier block 105. In some embodiments, the residual encoding block 111 performs adaptive fixed-length or variable-length residual binarization, as indicated at 321 in FIG. 3. Then, the multiplexing (MUX) block 113 generates the compressed bitstream using the string/block matches 319 and the encoded prediction residuals 321. In some embodiments, a context adaptive binary arithmetic coding (CABAC) method 323 can be used to combine the string/block matches 319 and the encoded prediction residuals 321, as shown in FIG. 3.

Turning to FIG. 2, the receiver 200 is configured to perform a screen content decoding process analogous to the screen content encoding process performed the transmitter 100, as described above. The receiver 200 receives the compressed video bitstream, and then, using the de-multiplexer 201, parses the bitstream into an encoded palette table, color index map, and encoded prediction residuals. The table decoding block 203 and palette table creating block 209 perform processes opposite from the table encoding block 107 and the palette table creating block 103 to reconstruct, for each CU, a complete palette table. Similarly, the index map decoding block 205 and residual decoding block 207 perform processes opposite from the index map encoding block 109 and the residual encoding block 111 to reconstruct the color index map. The color de-classifier block 211 derives the pixel value at each position by combing the color index map and palette table, thereby reconstructing a CTU or CU 213.

Although FIGS. 1 and 2 illustrate examples of a transmitter 100 and receiver 200 for performing screen content encoding and decoding, various changes may be made to FIGS. 1 and 2. For example, various components in FIGS. 1 and 2 could be combined, further subdivided, or omitted and additional components could be added according to particular needs. As a particular example, various components could be arranged together in one housing or on one circuit board, or be performed by a single processor or processing unit.

The following two pseudo code blocks show the hybrid 1D and 2D string search methods described above.

In the 1D search pseudo code below, curIdx is the starting address of the to-be-coded string, and refIdx represents all possible starting addresses of a reference string. For every given curIdx and refIdx, the process block performs a modified memory compare operation to find the first unmatched value. It then compares all the matched lengths and records the longest matched length (len, refIdx) as the winner of the 1D search for location curIdx. It is possible that a certain location in the current 1D search string has already been encoded by previous 2D searches. In this case, this location is treated as a match regardless of its value. A mismatch happens only when the location is not encoded and its ColorMap value is not equal to the ColorMap value at the corresponding location in the reference string.

(Pseudo code):

```
// 1D search
Int maxLen = 1;
Int dist = −1;
Int len = 0;
```

(Pseudo code):

```
for ( refIdx = 0; refIdx < curIdx; ++refIdx ) {
    for ( len = 0; len < ( uiTotal-curIdx ); len++ )
        if ( ( CurColorMap[refIdx+len] ! = CurColorMap[curIdx+len] ) && (
pbCodedMap[curIdx+len] == 0 ) )       break;
    if ( len > maxLen ) {
        maxLen = len;
        dist = ( curIdx - refIdx );
    }
}
```

Figure 11:
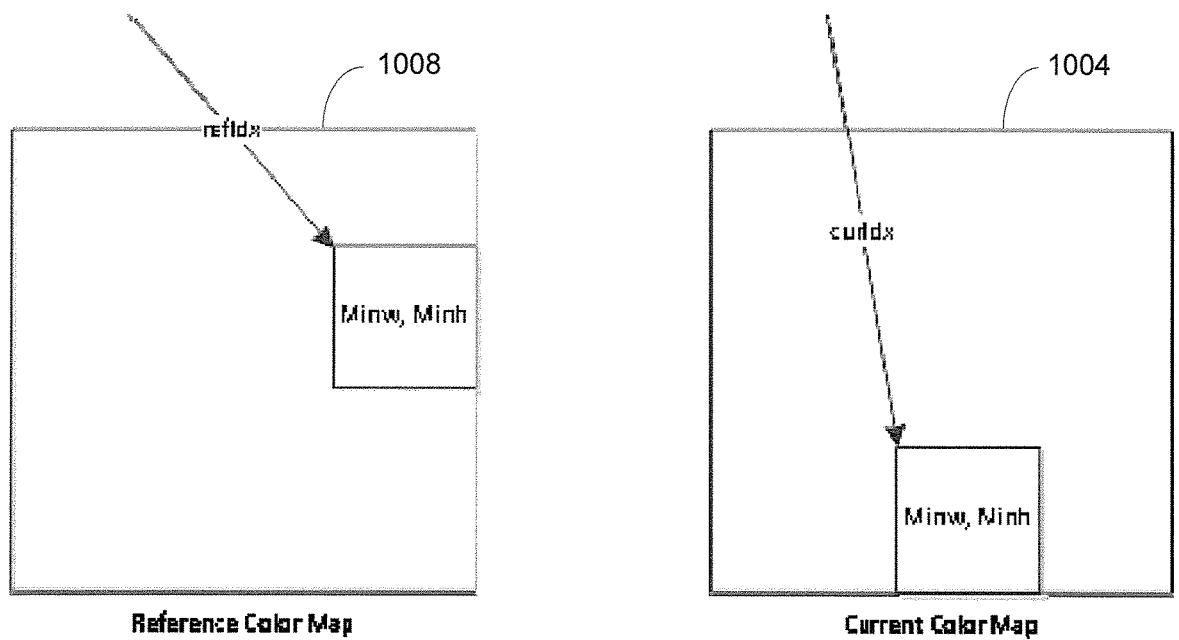

In the 2D search pseudo code below, curIdx is the top-left corner of the to-be-coded block, and refIdx represents all possible top-left corners of reference blocks. For example, as shown in FIG. 11, curIdx indicates the top-left corner of the to-be-coded block 1002 of the current color index map 1004, while refIdx top-left corners of reference blocks, such as the reference block 1006 in the reference color index map 1008. The process block calculates a maximum search window in the current color index map 1004 and saves the width and height of the window in variables cw0 and ch0. It also calculates a maximum search window in the reference color index map 1008 and saves the width and height in variables rw0 and rh0. The final search window is defined by minw=min(rw0, cw0) and minh=min(rh0, ch0), as shown in FIG. 11.

For every given curIdx and refIdx, the search process performs a modified memory comparison operation to find the first unmatched value in every line of the search window (minw, minh). It then compares all matched sizes for any height and records the longest matched size (width, height, refIdx and index of reference CTU) as the "winner" (i.e., the most advantage match of the 2D search for location curIdx).

It is possible that a certain region in the current 2D search window has already been coded by a previous 2D match. In such a case, this location is treated as a match regardless of its value. It is also possible that a certain region in the reference 2D search window has not been coded yet; in this case, this location is treated as a mismatch regardless of its value. A mismatch happens only when this location is not coded AND when this location in the reference search window is not coded, or its value in the current color index map 1004 is not equal to the color map value at the corresponding location in the reference string.

```
// 2D search
Int max2DSize   = 1;
Int max2DWidth  = 1;
Int max2DHeight = 1;
Int d2Dist      = -1;
Int d2Lcu       = -1;
pcRefCU = pcCU;
for ( Int n = 0; n < 4; ++n ) {
    for ( Int ry = 0; ry < uiRefHeight[n]; ++ry ) {
        for ( Int rx = 0; rx < uiRefWidth[n]; ++rx ) {
            refIdx = rx + ry * uiRefWidth[n];
            Int cw0 = uiWidth - curIdx%uiWidth;
            Int ch0 = uiHeight - curIdx/uiWidth;
            Int rw0 = uiRefWidth[n] - rx;
            Int rh0 = uiRefHeight[n] - ry;
            Int minw = ( rw0 < cw0 ) ? rw0 : cw0;
            Int minh = ( rh0 < ch0 ) ? rh0 : ch0;
            Int d2Width = MAX_INT;
            Int d2Size = 0;
            Int x     = 0;
            for ( Int y = 0; y < minh; ++y ) {
                for( x = 0; x < minw; ++x )
                    if( n == 0) {
                        if ( ( pbCodedMap[curIdx+x+y*uiWidth] == 0 ) && ( (
CurColorMap[curIdx+x+y*uiWidth] !=
CurColorMap[refIdx+x+y*uiWidth] ) || (
pbCodedMap[refIdx+x+y*uiWidth] == 0 ) ) )
                            break;
                    } else {
                        if ( ( pbCodedMap[curIdx+x+y*uiWidth] == 0 ) && (
CurColorMap[curIdx+x+y*uiWidth] !=
RefColorMap[n][refIdx+x+y*uiRefWidth[n]] ) )
                            break;
                    }
                d2Width = ( d2Width < x ) ? d2Width : x;
                d2Size = d2Width * ( y+1 );
                minw = d2Width;
                if ( d2Size > max2DSize ) {
                    max2DSize   = d2Size;
                    max2DWidth  = d2Width;
                    max2DHeight = y+1;
                    d2Dist      = refIdx;
                    d2Lcu       = n;
                }
            }
        }
    }
    if( ( pcRefCU = pcRefCU->getCULeft( ) ) == NULL )
        break;
}
```

After the search for the 1D string match and 2D area match is completed, if the 1D maxLen is bigger than the 2D max2DSize or the 2D area is smaller than a threshold area (currently set to be 4×4 in the pseudo code, although other areas are possible), then the 1D result is used for the curIdx. Otherwise, the 2D result is used for the curIdx. The coded map 900 is updated and the curIdx is advanced to next location.

```
if( max2DSize < = ( maxLen*1.1 ) || max2DWidth <
MIN_2D_WIDTH || max2DHeight < MIN_2D_HEIGHT ) {
    for( Int n = 0; n < maxLen; ++n ) {
        pbCodedMap[curIdx+n] = 1;
    }
    pDist[curIdx]   = ( maxLen == 1 ) ? -1 : dist;
    pLen[curIdx]    = maxLen;
    p2DHeight[curIdx] = 1;
    pbIdxDimensionFlag[curIdx] = 0;
    curIdx = curIdx + maxLen;
} else {
    for( Int y = 0; y < max2DHeight; ++y )
        for( Int x = 0; x < max2DWidth; ++x )
            pbCodedMap[curIdx+x+y*uiWidth] = 1;
    pDist[curIdx]      = d2Dist;
    pLen[curIdx]       = max2DWidth;
    p2DHeight[curIdx]  = max2DHeight;
    pbIdxDimensionFlag[curIdx] = ( d2Lcu << 1 ) | 1;
    curIdx = curIdx + max2DWidth;
}
```

Due to the nature of the hybrid 1D/2D search, the next curIdx location may have already been encoded by previous 2D searches. Accordingly, a raster scan is performed in the coded map 900 to find the first location that has not been coded as the new curIdx, such as with the pseudo code shown below.

```
while( ( curIdx < uiTotal ) && ( pbCodedMap[curIdx] ! = 0 ) )
    ++curIdx;
```

To encode the length of 1D string match, the bit stream syntax uses an adjusted length instead of maxLen to encode the 1D result. Given that some of the locations in maxLen have already been encoded during a previous 2D match, these locations are removed from maxLen, and the adjusted length is written to the bit stream. If the adjusted length is equal to 1, then this match is treated as unmatched data.

To encode the width and height of 2D block, the bit stream syntax uses length instead of width/height to encode the 2D result. The length here is defined as the raster location of the bottom right corner of the matched window in the search window defined by (minw, minh). It is further modified to reflect the fact that the width and height of both the search window and the matched window are bigger than the threshold window. The following pseudo code can be used.

```
ui2DSize = ( pLen[uiIdx] - MIN_2D_WIDTH )+( p2DHeight[uiIdx] - MIN_2D_HEIGHT
)*(1 + minw - MIN_2D_WIDTH);
```

The decoder can perform the same coded map operations for correct processing in the receiver 200.

In some embodiments, the following additional memory requirements may apply for a transmitter 100 or receiver 200 that performs the encoding or decoding operations described above:

CodedMap: CTU width×CTU height×1 bit
RefCodedMap: CTU width×CTU height×1 bit
2D Flag: CTU width×CTU height×1 bit
CTU index: CTU width×CTU height×2 bit
2D Height: CTU width×CTU height×8 bit
Reference Color Map: CTU width×CTU height×8 bit×4
2D Hash: CTU width×CTU height×8 bit×4
2D Hash Dictionary: CTU width×CTU height×16 bit×4
2D Hash Dictionary Last: 256×16 bit×4
1D Hash Dictionary: CTU width×CTU height×16 bit In some embodiments, hybrid 1D and 2D searches use approximately 80 KB of additional memory (e.g., for 20 CTUs).

In some embodiments, an 8-bit CRC hashing can be used to increase encoding speed. Of course, other types of hash function can also be used. For a 1D search, a 2-point hashing is calculated for every color map index, and a hash dictionary array is formulated using the calculated hash value. For a 2D search, a 4×4 block hashing is calculated for every color map index, and a hash array and a hash dictionary array are formulated using the calculated hash value.

Improved Distance and Length Coding

Instead of encoding the distance and length pairs directly, the following encoding method can be used based on the distribution of the distance and length pairs. For the distance encoding, a 1 bit flag can be used to indicate whether or not the distance is a significant distance. If it is not a significant distance, the distance encoding method disclosed above can apply (distance−2). If it is a significant distance, an additional 1-bit flag (e.g., a dist_equal_one_flag) can be used to indicate whether this significant distance is 1 or the width of the current CU. In some embodiments, if dist_equal_one_flag is true, the distance=1. If the dist_equal_oneflag is false, the distance=cuWidth. Here, distance=cuWidth indicates the index copy from the above line. It is also called CopyAbove mode. Distance=1 indicates the index copy from the left index. It is also called IndexMode.

For the length encoding, a 1 bit flag can also be used to indicate whether or not the current length is a significant length. If it is not a significant length, the length encoding method disclosed above can apply (length−cuWidth). If it is a significant length, a fixed binarization method can be used to encode the (length−1). In some embodiments, the number of bits in the binarization of the distance is $\log_2(cuWidth)$.

Decoder Syntax

The following decoder syntax in accordance with this disclosure is aligned with the current committee draft of HEVC RExt.

Sequence Parameter Set RBSP Syntax

|  | Descriptor |
|---|---|
| seq_parameter_set_rbsp( ) { |  |
|   sps_video_parameter_set_id | u(4) |
|   sps_max_sub_layers_minus1 | u(3) |
|   ... |  |
|   ... |  |
|   amp_enabled_flag | u(1) |
|   sample_adaptive_offset_enabled_flag | u(1) |
|   hybrid_color_index_search_eabled_flag | u(1) |
|   pcm_enabled_flag | u(1) |
|   .... |  |
|   ... |  |
| } |  |
| coding_unit( x0, y0, log2CbSize ) { |  |
|   if( transquant_bypass_enabled_flag ) |  |
|     cu_transquant_bypass_flag | ae(v) |
|   color_table_idx_flag | ae(v) |
|   if( color_table_idx_flag ) { |  |
|     color_table_size | ae(v) |
|     color_table_merge_flag | ae(v) |
|     if( color_table_merge_flag ) |  |
|       color_table_merge_dir | ae(v) |
|     else { |  |
|       color_table_idx_ref = {−1, −1, ..., −1} |  |
|       for( ch = 0; ch < 3; ch++ ) { |  |
|         num_bits_for_max_color_diff | ae(v) |
|         for( i = 0; i < color_table_size; i++ ) { |  |
|           if( ch == 0 && color_table_share_enabled ) { |  |
|             color_table_share_flag | ae(v) |
|             if( color_table_share_flag ) { |  |
|               color_table_share_idx_diff | ae(v) |
|               color_table_idx_ref[ i ] = ref_table_idx |  |
|             } |  |

-continued

| | Descriptor |
|---|---|
| ``}``<br>``    if( color_table_idx_ref[ i ] < 0 ) {``<br>``        if( i = = 0 )``<br>``            color_value`` | u(8) |
| ``        else {``<br>``            abs_color_diff`` | ae(v) |
| ``            if( code_color_diff_sign )``<br>``                color_diff_sign`` | ae(v) |
| ``        }``<br>``    }``<br>``}``<br>``}``<br>``if( color_table_size > 1 ) {``<br>``color_idx_map_scan_dir`` | ae(v) |
| ``cuWidth = 1 << log2CbSize;``<br>``cuHeight = 1 << log2CbSize;``<br>``    for( i = 0; i < cuWidth * cuHeight) {``<br>``        idx_match_flag`` | ae(v) |
| ``        if( idx_match_flag)``<br>``            unmatched_idx`` | ae(v) |
| ``        else {``<br>``if ( sps_hybrid_index_search_enabled_flag)``<br>``    2d_block_search_flag`` | ae(v) |
| ``if (2d_block_search_flag) {``<br>``    2d_ctu_index`` | ae(v) |
| ``    2d_distance`` | ae(v) |
| ``    2d_length`` | ae(v) |
| ``} else {``<br>``        sig_dist_flag``<br>``        if( sig_dist_flag )``<br>``            dist_equal_one_flag`` | ae(v) |
| ``        else``<br>``            distance`` | ae(v) |
| ``            sig_len_ flag`` | ae(v) |
| ``    if ( sig_len_ flag ) {``<br>``        length_less_than_cu_width`` | ae(v) |
| ``        i += length_less_than_cu_width + 1 ;``<br>``    } else {``<br>``            length_larger_than_cu_width`` | ae(v) |
| ``            i += length_larger_than_cu_width + cuWidth;``<br>``        }``<br>``    }``<br>``        }``<br>``    }``<br>``}``<br>``} else {``<br>``if( slice_type != I )``<br>``    cu_skip_flag[ x0 ][ y0 ]`` | ae(v) |
| ``nCbS = ( 1 << log2CbSize )``<br>``if( cu_skip_flag[ x0 ][ y0 ] )``<br>``    prediction_unit( x0, y0, nCbS, nCbS )``<br>``else``<br>``{``<br>``    if( intra_block_copy_enabled_flag )``<br>``        intra_bc_flag[ x0 ][ y0 ]`` | ae(v) |
| ``    if( slice_type != I && !intra_bc_flag[ x0 ][ y0 ] )``<br>``        pred_mode_flag`` | ae(v) |
| ``    if( CuPredMode[ x0 ][ y0 ] != MODE_INTRA | | intra_bc_flag[ x0 ][ y0 ] | |``<br>``        log2CbSize = = MinCbLog2SizeY )``<br>``        part_mode`` | ae(v) |
| ``    if( CuPredMode[ x0 ][ y0 ] = = MODE_INTRA ) {``<br>``        if(PartMode = = PART_2Nx2N && pcm_enabled_flag &&``<br>``            !intra_bc_flag[ x0 ][ y0 ] &&``<br>``            log2CbSize >= Log2MinIpcmCbSizeY &&``<br>``            log2CbSize <= Log2MaxIpcmCbSizeY )``<br>``            pcm_flag[ x0 ][ y0 ]`` | ae(v) |
| ``        if(pcm_flag[ x0 ][ y0 ] ){``<br>``            while( !byte_aligned( ) )``<br>``                pcm_alignment_zero_bit`` | f(1) |
| ``            pcm_sample( x0, y0, log2CbSize )``<br>``        } else if( intra_bc_flag[ x0 ][ y0 ] ) {``<br>``            mvd_coding( x0, y0, 2)``<br>``            if( PartMode = = PART_2NxN )``<br>``                mvd_coding( x0, y0 + ( nCbS / 2 ), 2)``<br>``            else if( PartMode = = PART_Nx2N )``<br>``                mvd_coding( x0 + ( nCbS / 2 ), y0, 2)`` | |

|  | Descriptor |
|---|---|
| ``` |  |
|         else if( PartMode = = PART_NxN ) { |  |
|             mvd_coding( x0 + ( nCbS / 2 ), y0, 2) |  |
|             mvd_coding( x0, y0 + ( nCbS / 2 ), 2) |  |
|             mvd_coding( x0 + ( nCbS / 2 ), y0 + ( nCbS / 2 ), 2) |  |
|         } |  |
|     } else { |  |
|         pbOffset = ( PartMode = = PART_NxN ) ? ( nCbS / 2 ) : nCbS |  |
|         for( j = 0; j < nCbS; j = j + pbOffset ) |  |
|             for( i = 0; i < nCbS; i = i + pbOffset ) |  |
|                 prev_intra_luma_pred_flag[ x0 + i ][ y0 + j ] | ae(v) |
|         for( j = 0; j < nCbS; j = j + pbOffset ) |  |
|             for( i = 0; i < nCbS; i = i + pbOffset ) |  |
|                 if( prev_intra_luma_pred_flag[ x0 + i ][ y0 + j ] ) |  |
|                     mpm_idx[ x0 + i ][ y0 + j ] | ae(v) |
|                 else |  |
|                     rem_intra_luma_pred_mode[ x0 + i ][ y0 + j ] | ae(v) |
|         if( ChromaArrayType = = 3 ) |  |
|             for( j = 0; j < nCbS; j = j + pbOffset ) |  |
|                 for( i = 0; i < nCbS; i = i + pbOffset ) |  |
|                     intra_chroma_pred_mode[ x0 + i ][ y0 + j ] | ae(v) |
|         else if( ChromaArrayType != 0 ) |  |
|             intra_chroma_pred_mode[ x0 ][ y0 ] | ae(v) |
|     } |  |
| } else { |  |
|     if( PartMode = = PART_2Nx2N ) |  |
|         prediction_unit( x0, y0, nCbS, nCbS ) |  |
|     else if( PartMode = = PART_2NxN ) { |  |
|         prediction_unit( x0, y0, nCbS, nCbS / 2 ) |  |
|         prediction_unit( x0, y0 + ( nCbS / 2 ), nCbS, nCbS / 2 ) |  |
|     } else if( PartMode = = PART_Nx2N ) { |  |
|         prediction_unit( x0, y0, nCbS / 2, nCbS ) |  |
|         prediction_unit( x0 + ( nCbS / 2 ), y0, nCbS / 2, nCbS ) |  |
|     } else if( PartMode = = PART_2NxnU ) { |  |
|         prediction_unit( x0, y0, nCbS, nCbS / 4 ) |  |
|         prediction_unit( x0, y0 + ( nCbS / 4 ), nCbS, nCbS * 3 / 4 ) |  |
|     } else if( PartMode = = PART_2NxnD ) { |  |
|         prediction_unit( x0, y0, nCbS, nCbS * 3 / 4 ) |  |
|         prediction_unit( x0, y0 + ( nCbS * 3 / 4 ), nCbS, nCbS / 4 ) |  |
|     } else if( PartMode = = PART_nLx2N ) { |  |
|         prediction_unit( x0, y0, nCbS / 4, nCbS ) |  |
|         prediction_unit( x0 + ( nCbS / 4 ), y0, nCbS * 3 / 4, nCbS ) |  |
|     } else if( PartMode = = PART_nRx2N ) { |  |
|         prediction_unit( x0, y0, nCbS * 3 / 4, nCbS ) |  |
|         prediction_unit( x0 + ( nCbS * 3 / 4 ), y0, nCbS / 4, nCbS ) |  |
|     } else { /* PART_NxN */ |  |
|         prediction_unit( x0, y0, nCbS / 2, nCbS / 2 ) |  |
|         prediction_unit( x0 + ( nCbS / 2 ), y0, nCbS / 2, nCbS / 2 ) |  |
|         prediction_unit( x0, y0 + ( nCbS / 2 ), nCbS / 2, nCbS / 2 ) |  |
|         prediction_unit( x0 + ( nCbS / 2 ), y0 + ( nCbS / 2 ), nCbS / 2, nCbS / 2 ) |  |
|     } |  |
| } |  |
| if( !pcm_flag[ x0 ][ y0 ] ) { |  |
|     if( CuPredMode[ x0 ][ y0 ] != MODE_INTRA && |  |
|         !( PartMode = = PART_2Nx2N && merge_flag[ x0 ][ y0 ] ) | | |  |
|         ( CuPredMode[ x0 ][ y0 ] = = MODE_INTRA && intra_bc_flag[ x0 ][ y0 ] ) ) |  |
|         rqt_root_cbf | ae(v) |
|     if( rqt_root_cbf ) { |  |
|         MaxTrafoDepth = ( CuPredMode[ x0 ][ y0 ] = = MODE_INTRA ? |  |
|                         ( max_transform_hierarchy_depth_intra + IntraSplitFlag ) : |  |
|                         max_transform_hierarchy_depth_inter ) |  |
|         transform_tree( x0, y0, x0, y0, log2CbSize, 0, 0 ) |  |
|     } |  |
| } |  |
| } |  |

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for screen content coding, the method comprising:
    obtaining an initial palette table based on a coding unit (CU), wherein the initial palette table comprises a histogram of color values of each pixel in the CU, and wherein the histogram is ordered according to data associated with each pixel in the CU;
    applying a neighboring color grouping process on the histogram of color values to obtain a palette table that is more compact than the initial palette table, wherein the neighboring color grouping process is applied in multiple stages according to a pre-defined color error allowance that corresponds to a current stage number for each of the multiple stages;
    obtaining a color index map based on the CU and the palette table;
    encoding the color index map and the palette table;
    combining the palette table and the color index map to generate a combined palette table and color index map after the encoding; and
    transmitting the combined palette table and color index map to a decoding apparatus configured to display an image based on the combined palette table and color index map.

2. The method of claim 1, wherein deriving the palette table comprises implicitly deriving the palette table using an upper or left neighbor of the CU.

3. The method of claim 1, wherein encoding the palette table comprises:
    coding at least one first entry in the palette table using an inter-table palette stuffing process; and
    coding at least one second entry in the palette table using an intra-table color differential pulse-code modulation (DPCM) process.

4. The method of claim 3, wherein during the inter-table palette stuffing process, the at least one first entry in the palette table is coded based on a matching entry in a palette predictor derived from at least one neighbor CU.

5. The method of claim 4, wherein the palette predictor is configured to be coded at a slice level or sequence level.

6. The method of claim 3, wherein in the intra-table DPCM process, the at least one second entry in the palette table is coded as a difference between the at least one second entry and an earlier-coded entry in the palette table.

7. The method of claim 1, wherein encoding the color index map comprises using a hybrid one-dimensional (1D) and two-dimensional (2D) color index map coding process, wherein the hybrid 1D and 2D color index map coding process comprises determining, for each index value in the color index map, whether there is a 1D string match or a 2D block match at a location of the index value.

8. The method of claim 7, wherein when there is a 1D string match for the index value, the 1D string match is encoded as a matched length and a distance or location.

9. The method of claim 8, wherein:
    when the distance is equal to one, the encoding is processed as IndexMode mode; and
    when the distance is equal to CU width, the encoding is processed as CopyAbove mode.

10. The method of claim 7, wherein when there is a 2D block match for the index value, the 2D block match is encoded as a matched block width, a matched block height, a corresponding reference coding tree unit (CTU) index, and a location of a reference index.

11. The method of claim 7, wherein when there is a 2D block match for the index value, a width and height of the 2D block match is fixed to the width and height of the CU.

12. The method of claim 7, wherein when there is neither a 1D string match or a 2D block match for the index value, the index value is encoded as an unmatched index value.

13. An apparatus configured for screen content coding, the apparatus comprising:
    at least one memory; and
    at least one processor coupled to the at least one memory, the at least one processor configured to:
        obtain an initial palette table based on a coding unit (CU), wherein the initial palette table comprises a histogram of color values of each pixel in the CU, and wherein the histogram is ordered according to data associated with each pixel in the CU;
        apply a neighboring color grouping process on the histogram of color values to obtain a palette table that is more compact than the initial palette table, wherein the neighboring color grouping process is applied in multiple stages according to a pre-defined color error allowance that corresponds to a current stage number for each of the multiple stages;
        obtain a color index map based on the CU and the palette table;
        encode the color index map and the palette table;
        combine the palette table and the color index map to generate a combined palette table and color index map after encoding; and
        transmit the combined palette table and color index map to a decoding apparatus configured to display an image based on the combined palette table and color index map.

14. The apparatus of claim 13, wherein deriving the palette table comprises implicitly deriving the palette table using an upper or left neighbor of the CU.

15. The apparatus of claim 13, wherein encoding the palette table comprises coding at least one first entry in the palette table using an inter-table color sharing process and coding at least one second entry in the palette table using an intra-table color differential pulse-code modulation (DPCM) process.

16. The apparatus of claim 15, wherein during the inter-table palette stuffing process, the at least one first entry in the palette table is coded based on a matching entry in a palette predictor derived from at least one neighbor CU.

17. The apparatus of claim 16, wherein the palette predictor is configured to be coded at a slice level or sequence level.

18. The apparatus of claim 15, wherein in the intra-table DPCM process, the at least one second entry in the palette table is coded as a difference between the at least one second entry and an earlier-coded entry in the palette table.

19. The apparatus of claim 13, wherein encoding the color index map comprises using a hybrid one-dimensional (1D) and two-dimensional (2D) color index map coding process, wherein the hybrid 1D and 2D color index map coding process comprises determining, for each index value in the color index map, whether there is a 1D string match or a 2D block match at a location of the index value.

20. The apparatus of claim 19, wherein when there is a 1D string match for the index value, the 1D string match is encoded as a matched length and a distance or location.

21. The apparatus of claim 20, wherein:
when the distance is equal to one, the encoding is processed as IndexMode mode; and
when the distance is equal to CU width, the encoding is processed as CopyAbove mode.

22. The apparatus of claim 19, wherein when there is a 2D block match for the index value, the 2D block match is encoded as a matched block width, a matched block height, a corresponding reference coding tree unit (CTU) index, and a location of a reference index.

23. The apparatus of claim 19, wherein when there is a 2D block match for the index value, a width and height of the 2D block match is fixed to the width and height of the CU.

24. The apparatus of claim 19, wherein when there is neither a 1D string match or a 2D block match for the index value, the index value is encoded as an unmatched index value.

* * * * *

UNITED STATES PATENT AND TRADEMARK OFFICE
CERTIFICATE OF CORRECTION

PATENT NO. : 10,638,143 B2
APPLICATION NO. : 14/664284
DATED : April 28, 2020
INVENTOR(S) : Zhan Ma et al.

Page 1 of 1

It is certified that error appears in the above-identified patent and that said Letters Patent is hereby corrected as shown below:

On the Title Page

Page 3, item [56], Column 2, Lines 49-52, should read:
LIN, T., et al., "AHG7: Full-chroma (YUV444) dictionary+hybrid dual-coder extension of HEVC", JCT-VC of ITU-T SG 16 WP 3 and ISO/IEC JTC 1/SC 29/WG 11, JCTVC-K0133, Oct. 10-19, 2012, 5 pages.

Signed and Sealed this
Ninth Day of June, 2020

Andrei Iancu
*Director of the United States Patent and Trademark Office*